(12) United States Patent
Goodis

(10) Patent No.: US 7,410,254 B2
(45) Date of Patent: Aug. 12, 2008

(54) HEATED EYEWEAR

(76) Inventor: Craig James Goodis, 44121 Winthrop Dr., Novi, MI (US) 48375

( * ) Notice: Subject to any disclaimer, the term of this patent is extended or adjusted under 35 U.S.C. 154(b) by 0 days.

(21) Appl. No.: 11/154,908

(22) Filed: Jun. 15, 2005

(65) Prior Publication Data

US 2006/0197906 A1 Sep. 7, 2006

Related U.S. Application Data

(60) Provisional application No. 60/657,470, filed on Mar. 1, 2005.

(51) Int. Cl.
*G02C 1/00* (2006.01)
(52) U.S. Cl. .......................... 351/158; 351/41
(58) Field of Classification Search .................. 351/41, 351/83, 111, 158, 86; 128/828, 858; 219/201; 604/289–291, 301
See application file for complete search history.

(56) References Cited

U.S. PATENT DOCUMENTS

| | | | | |
|---|---|---|---|---|
| 3,140,390 A | * | 7/1964 | Smith et al. | ............... 607/109 |
| 3,160,735 A | * | 12/1964 | Aufricht | ....................... 2/435 |
| 4,152,846 A | * | 5/1979 | Witt | ............................ 434/36 |
| 4,209,234 A | * | 6/1980 | McCooeye | ................... 351/62 |
| 4,942,629 A | | 7/1990 | Stadlmann | |
| 5,319,397 A | * | 6/1994 | Ryden | ......................... 351/62 |
| 5,363,153 A | * | 11/1994 | Bailiff | ......................... 351/78 |
| 5,459,533 A | | 10/1995 | McCooeye et al. | |
| 6,091,546 A | | 7/2000 | Spitzer | |
| 2005/0248718 A1 | * | 11/2005 | Howell et al. | .................. 351/41 |

FOREIGN PATENT DOCUMENTS

| | | | | |
|---|---|---|---|---|
| DE | 3229021 A1 | 2/1984 | | |
| DE | 3818389 C1 | 10/1989 | | |
| GB | 2 362 474 A | 11/2001 | | |
| JP | 58-113914 | * | 7/1983 | ................ 351/158 |
| JP | 3-27014 | * | 2/1991 | ................ 351/62 |
| WO | WO 00/43826 | 7/2000 | | |

\* cited by examiner

*Primary Examiner*—Huy K Mai
(74) *Attorney, Agent, or Firm*—Kenyon & Kenyon LLP

(57) ABSTRACT

Eyewear, e.g., an apparatus to be worn on or adjacent to a person's eyes, which includes a heating element that is configured to provide heat. The heat provided may be sufficient to provide warmth to a wearer of the eyewear or to prevent accumulation of, e.g., snow, ice, fog or any other type of matter, whether environmental or otherwise. The eyewear may include an actuation element for actuating the heating element, the actuation element being configured to cause the heating element to generate heat either automatically or manually. Power for the heating element to generate heat may be provided by a power source, such as a battery.

33 Claims, 1 Drawing Sheet

HEATED EYEWEAR

RELATED APPLICATIONS

This application is based on and claims the benefit of priority to Applicant's co-pending U.S. Provisional Patent Application Ser. No. 60/657,470, entitled "Heated Eyewear" and filed on Mar. 1, 2005, the disclosure of which is expressly incorporated herein in its entirety by reference thereto.

FIELD OF THE INVENTION

The present invention relates to eyewear and more specifically to heated eyewear.

BACKGROUND INFORMATION

There are many activities in which a person requires the provision of additional heat. While the heat for most of these activities is supplied by heat sources that introduce heat into the atmosphere in the vicinity of the person, e.g., a building heating system that employs a boiler, radiators, etc., there are some activities for which such a heating source is not available or is insufficient to provide heat in a specific desired location, such as near or adjacent to a person's face or eyes.

Thus, there is a need for an apparatus for directing heat to a specific desired location, such as near or adjacent to a person's face or eyes.

SUMMARY OF THE INVENTION

The present invention, according to one example embodiment thereof, relates to eyewear, e.g., any apparatus to be worn on or adjacent to a person's eyes. The eyewear includes a heating element that is configured to provide heat. Advantageously, the heat provided is sufficient to provide at least some improvement in warmth to the wearer. In addition or alternatively, the heat provided may be sufficient to perform some other function, such as preventing the accumulation on at least a portion of the eyewear or at least a portion of the wearer's face of, e.g., snow, ice, fog or any other type of matter, whether environmental or otherwise.

The eyewear may also include an actuation element for actuating the heating element. The actuation element may operate automatically or manually. Power for the heating element to generate heat may be provided by a power source, such as a battery. A backup power source may also be employed.

DETAILED DESCRIPTION

Figure 1:
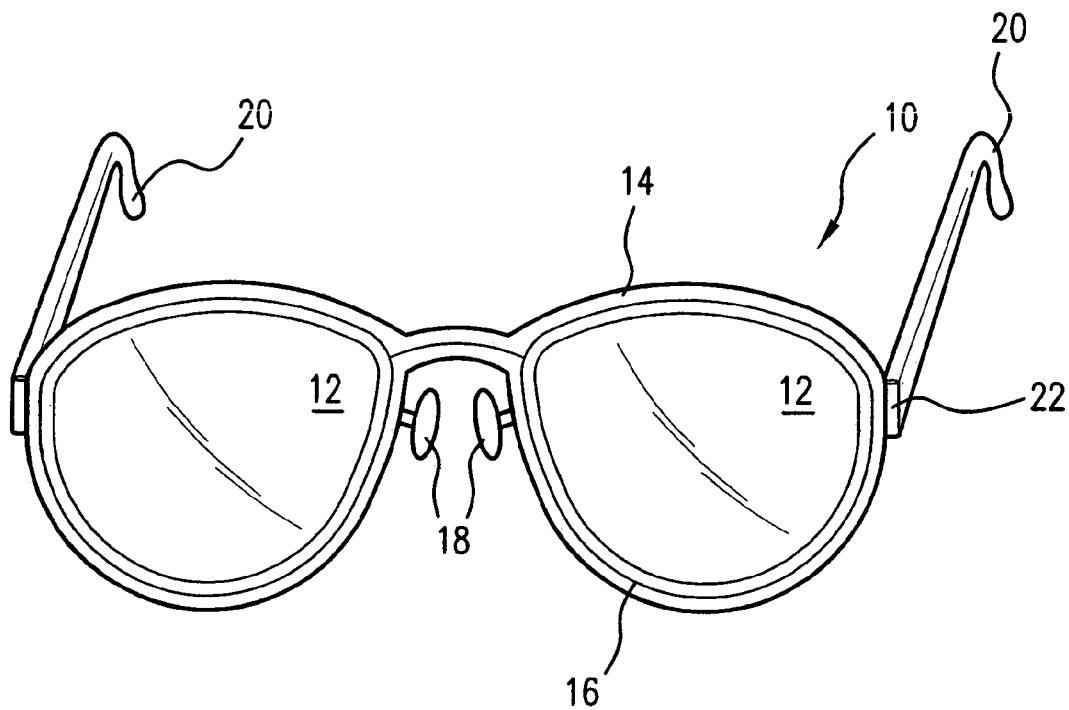
FIG. 1 is a front view of a set of eyewear, in accordance with one embodiment of the present invention.

FIG. 1 is a front view of a set of eyewear, in accordance with one embodiment of the present invention. It should be understood that the term "eyewear" may refer to any type of eyewear, including but not limited to: prescription or non-prescription eyeglasses; prescription or non-prescription sunglasses; goggles, visors, shields, helmets or any other type of apparatus that may be worn by a wearer for any conceivable purpose such as for skiing, skydiving, hunting, paintball or other entertainment or interactive games, safety, combat, infrared or night-vision, driving or riding vehicles, welding or any other type of construction work, any type of laboratory work, police work, space travel, etc.

FIG. 1 illustrates a pair of eyeglasses 10, in accordance with one embodiment of the present invention. While the present invention is described hereinbelow as a pair of eyeglasses, it should be understood that any type of eyewear as defined above may be employed. In the embodiment shown, the eyeglasses 10 include a pair of lenses 12 that are supported by a frame 14. The lenses 12 may be fabricated from any type of material, including but not limited to plastic, glass, etc., and may be water, solar, scratch, salt water and/or glare resistant and/or fire retardant. In addition, the frame 14 may be fabricated from any type of material, including but not limited to metal, plastic, glass, etc., and may also be water, solar, scratch, salt water and/or glare resistant and/or fire retardant. The lenses 12 and/or the frame 14 may be flexible or rigid, depending on the desired application. The lenses 12 may have automatic or manually-operated shading or tinting capabilities.

The frame 14 may include a heating element 16. The heating element 16 is shown in FIG. 1 as being disposed throughout the entire frame 14. However, it should be understood that the heating element 16 may being disposed in a part of, or in any portion of, the frame 14, and/or may be disposed in a part of, or in any portion of, the other components of the eyeglasses 10. In addition, it should be understood that, while the wire shown in FIG. 1 forms a single heating element 16, in various other embodiments, the frame 14 may include one or more heating elements 16 that may or may not be connected to each other and which operate either together or independently from each other.

The heating element 16 may be any material or component that is capable of providing heat. In the embodiment shown, the heating element is a heat conductive wire. The wire may be fabricated from any material that conducts heat.

The eyeglasses 10 may also include a pair of nose-pieces 18 that are employed to support the eyeglasses 10 on the nose of a wearer. The nose-pieces 18 may also include a heating element 16. Alternatively, the nose-pieces 18 may be fabricated from a heat insulating material. In this alternative embodiment, the nose-pieces 18 may operate to prevent the heating elements 16 from directly contacting the skin of the wearer. It should also be recognized that, in some embodiments, any other portion or portions of the eyeglasses 10, e.g., the ear pieces, may be fabricated from a heat insulating material so as to prevent any hot surfaces from directly contacting the skin of the wearer. Alternatively, depending on the amount of heat that is generated by the heating element 16, it may be preferable that a hot or warm surface does directly contact the skin of the wearer. Thus, depending on the application, the heat generated by the heating element 16 may be provided to the wearer either directly, e.g., by direct contact with the skin, and/or indirectly, e.g., by radiating heat towards the skin of the wearer without actually touching the skin of the wearer. In one embodiment, the heating element 16 may be heated to a temperature of between 50° to 150° F., preferably 70° F. to 110° F., more preferably 80° F. to 100° F., and most preferably about 90° F.

Figure 2:
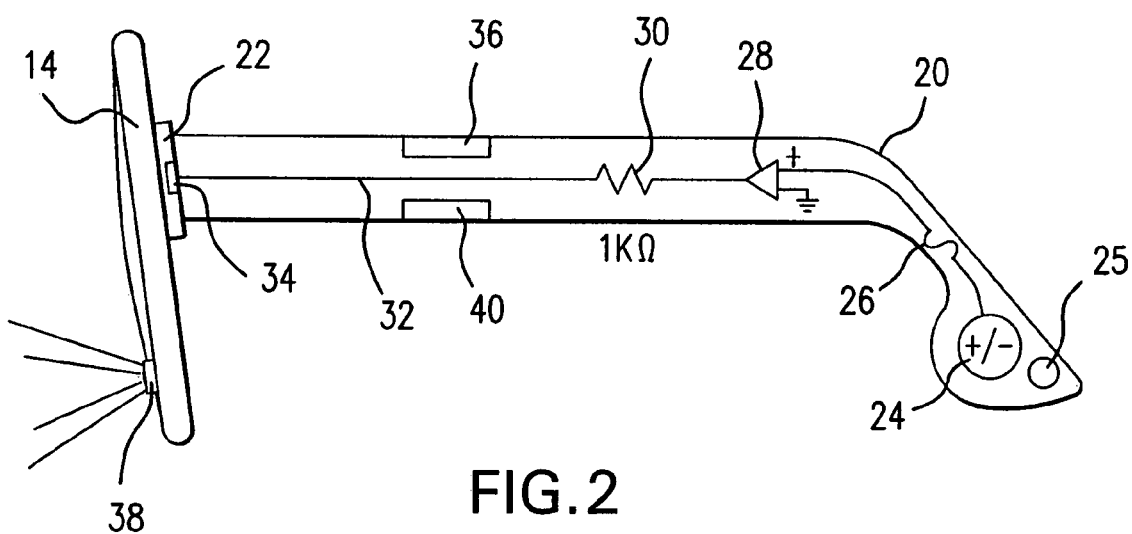
FIG. 2 is a side view of the earpiece, according to one embodiment of the present invention.

The eyeglasses 10 also include ear-pieces 20. The ear-pieces 20 may be attached to the frame 14 in any manner, such as by a hinge 22 or the like. The hinge 22 may operate to permit the ear-pieces 20 to be folded against the frame 14 when the eyeglasses are not in use. While FIG. 1 illustrates the general position of the ear-pieces 20, additional details of the ear-pieces 20 are illustrated in FIG. 2. Referring now to FIG. 2, there is shown one ear-piece 20, according to one embodiment of the present invention. In this embodiment, the ear-piece 20 includes a power source 24. The power source 24 may be any type of component capable of providing a sufficient amount of power to the other components of the eyeglasses 10 so as to heat the heating element 16 to a desired temperature. Advantageously, the power source 24 is a battery, e.g., a conventional watch battery or the like that provides 1 volt/0.25 amperage. Preferably, the power source 24 is replaceable when necessary, although in other embodiments the power source 24 may be integrally formed with or within the ear-piece 20. It should be understood that the power source 24 need not be located with or within the ear-piece 20, but may alternatively be located with or within any other part of the eyeglasses 10.

In the embodiment shown, the power source 24 is electrically connected to a voltage protection element 26, such as a fuse. The voltage protection element 26 is in turn electrically connected to an output amplifier 28. The output amplifier 28 is in turn electrically connected to a thermistor 30. The thermistor 30 may function to regulate the amount of heat generated by the heating element 16. The thermistor 30 is electrically connected to the heating element 16 in the frame 14 by a connecting wire 32. According to one embodiment, the connecting wire 32 is permanently connected to the heating element 16 in the frame, while in an alternative embodiment, the hinge 22 is configured to selectively connect the connecting wire 32 to the heating element 16. For instance, in one such embodiment, the connecting wire 32 may be connected to the heating element 16 when the ear-piece 20 is moved to the open position, e.g., the position at which the eyeglasses 10 are worn, while the connecting wire 32 may be disconnected from the heating element 16 when the ear-piece 20 is moved to the closed position, e.g., the position at which the eyeglasses 10 are stored.

The eyeglasses 10 may also include an actuation element 34. In the embodiment shown, the actuation element 34 may be a switch that is located at or within the hinge 22. The actuation element 34 may be connected to the other electrical components of the eyeglasses 10 and may operate in the manner describe above whereby the heating element 16 is caused to be heated upon the opening of the eyeglasses 10 into the open position. Various other actuation elements 34 may be employed. For instance, the actuation element 34 may be a level-actuatable switch such that the heating element 16 is caused to be heated when the eyeglasses 10 are positioned in a substantially vertical alignment as would be the case when the eyeglasses 10 are worn by a person that is standing upright. Of course, such a level-actuatable switch may operate to heat the heating element 16 at any conceivable position.

Another actuation element 34 may be a manually operated switch, located anywhere on the eyeglasses 10, that is moveable by a wearer in order to selectively turn on, turn off, and/or adjust the heat generated by, the heating element 16. Still another actuation element 34 may be an automatic mechanism that turns on, turns off, and/or adjusts the heat generated by, the heating element 16 in response to an environmental factor, e.g., including but not limited to temperature, wind speed, barometric pressure, etc. Referring to one example embodiment in which the temperature is the environmental factor, the actuation element 34 may include a temperature sensor that turns on the heating element 16 when the temperature experienced by the wearer is below a pre-determined level, e.g., below freezing, and that automatically causes the heating element 16 to provide additional heat when the temperature is reduced still further below the pre-determined level. Still another actuation element 34 may be a voice-activation mechanism by which a wearer may turn on, turn off or adjust the heat generated by the heating element 16 by speaking a command or by making a particular sound. Still another actuation element 34 may be a remote control mechanism, e.g., a wireless transmitter and receiver arrangement, by which a wearer may turn on, turn off or adjust the heat generated by, the heating element 16.

It should be recognized that the specific components described hereinabove for generating and conveying heat to the heating element or elements 16 are merely one possible arrangement for performing these functions. It should be understood that the components described herein above may be located in or on any portion of the eyeglasses 10 (and where the eyewear is not eyeglasses, the components may be located in or on any portion of the eyewear apparatus), either integrally, permanently or temporarily. Furthermore, any other components that are capable of generating and conveying heat may be used. For instance, the heating element 16 may be electrically powered by different electrical components than those described hereinabove. Additionally, or alternatively, the types of power that may be employed by the heating element 16 may include, without being limited by, solar power, chemical power, electromechanical power, e.g., such as by shaking, hydrogen power, lunar power, nuclear power, or any combination of types of power. In addition, the eyeglasses 10 may include a back-up power source 25 in the event that the primary power source 24 fails to function. Still further, it should be recognized that any of these power types may be employed as the primary power source 24, and any of these power types may be employed as the back-up or secondary power source 25.

The heating element 16 may also be used in conjunction with other features, such as, without limitation, ground position sensor 36 ("GPS") technology, a lighting element 38 of any kind, a compass, a clock, and/or a microprocessor electronic memory unit or data unit 40 for the storage, transfer or display of any type of data, including but not limited to service data, directional data, academic or educational data, DVD or other video display data, etc. In one embodiment, the microprocessor electronic memory unit 40 is configured to adjust the temperature range of the heating element 16. In one embodiment, these additional features of the eyeglasses 10 are powered by the same power source 24 (and/or the same back-up power source 25) as is employed by the heating element 16. Alternatively, other power sources may be provided for these purposes.

Thus, the several aforementioned objects and advantages of the present invention are most effectively attained. Those skilled in the art will appreciate that numerous modifications of the exemplary example embodiments described hereinabove may be made without departing from the spirit and scope of the invention. Although various exemplary example embodiments of the present invention have been described and disclosed in detail herein, it should be understood that this invention is in no sense limited thereby and that its scope is to be determined by that of the appended claims.

What is claimed is:

1. An apparatus to be worn on or adjacent to a person's eyes, the apparatus comprising:
   a frame;
   an integral heating element that is disposed in and throughout the frame and is configured to provide heat directly or indirectly to provide warmth to the skin of a wearer; and
   a thermistor to regulate the amount of heat generated by the integral heating element and to keep the frame at an approximately constant temperature.

2. The apparatus of claim 1, wherein the apparatus is one of prescription or non-prescription eyeglasses, prescription or non-prescription sunglasses, goggles, a visor, a shield and a helmet.

3. The apparatus of claim 1, wherein the apparatus is suitable to be worn by the person for at least one of skiing, skydiving, hunting, paintball or other entertainment or interactive games, safety, combat, infrared or night-vision, driving or riding vehicles, welding or any other type of construction work, any type of laboratory work, police work and space travel.

4. The apparatus of claim 1, wherein the heat provided is sufficient to prevent accumulation on at least a portion of the apparatus or on at least a portion of the wearer's face of at least one of snow, ice and fog.

5. The apparatus of claim 1, further comprising an actuation element for actuating the heating element.

6. The apparatus of claim 5, wherein the actuation element operates at least one of automatically and manually.

7. The apparatus of claim 5, wherein the actuation element is a switch.

8. The apparatus of claim 7, wherein actuation element is a manually operated switch.

9. The apparatus of claim 7, wherein the switch is located at or within a hinge connected to an earpiece.

10. The apparatus of claim 9, wherein the switch is configured such that the heating element is caused to be heated upon the earpiece being opened into a position suitable to be worn by the person.

11. The apparatus of claim 7, wherein the switch is a level-actuatable switch.

12. The apparatus of claim 11, wherein the level-actuatable switch is configured such that the heating element is caused to be heated when the apparatus is positioned in a substantially vertical alignment.

13. The apparatus of claim 5, wherein the actuation element is automatic.

14. The apparatus of claim 13, wherein the actuation element actuates the heating element in response to an environmental factor.

15. The apparatus of claim 14, wherein environmental factor is at least one of a temperature, a wind speed, and a barometric pressure.

16. The apparatus of claim 5, wherein actuation element is a voice-activation mechanism.

17. The apparatus of claim 5, wherein the actuation element is a remote control mechanism.

18. The apparatus of claim 1, further comprising a power source.

19. The apparatus of claim 18, wherein the power source is a battery.

20. The apparatus of claim 18, wherein the power source employs at least one of solar power, chemical power, electromechanical power, hydrogen power, lunar power, and nuclear power.

21. The apparatus of claim 1, wherein the apparatus includes a ground position sensor.

22. The apparatus of claim 1, wherein the apparatus includes a lighting element.

23. The apparatus of claim 1, wherein the apparatus includes a compass.

24. The apparatus of claim 1, wherein the apparatus includes a clock.

25. The apparatus of claim 1, wherein the apparatus includes one of a microprocessor electronic memory unit and a data unit.

26. The apparatus of claim 25, wherein the one of a microprocessor electronic memory unit and data unit is configured to at least one of store, transfer and display data.

27. The apparatus of claim 26, wherein the data includes at least one of service data, directional data, academic or educational data, DVD or other video display data.

28. The apparatus of claim 1, further comprising at least one component that is fabricated from a heat insulating material.

29. The apparatus of claim 28, wherein the at least one component is one of a nose-piece and an earpiece.

30. The apparatus of claim 1, wherein the heating element is heated to a temperature of between about 50° to about 150° F.

31. The apparatus of claim 30, wherein the heating element is heated to a temperature of between about 70° F. to about 110° F.

32. The apparatus of claim 31, wherein the heating element is heated to a temperature of between about 80° F. to about 100° F.

33. The apparatus of claim 32, wherein the heating element is heated to a temperature of about 90° F.

* * * * *